(12) United States Patent
Bredy

(10) Patent No.: US 6,302,076 B1
(45) Date of Patent: Oct. 16, 2001

(54) INTERNAL COMBUSTION ENGINE WITH INTAKE MANIFOLD PLENUM AND METHOD OF USE

(76) Inventor: Joseph M. Bredy, 34221 S. Wilhoit Rd., Molalla, OR (US) 97036

( * ) Notice: Subject to any disclaimer, the term of this patent is extended or adjusted under 35 U.S.C. 154(b) by 0 days.

(21) Appl. No.: 09/524,330

(22) Filed: Mar. 13, 2000

(51) Int. Cl.[7] ................................................. F02M 35/10
(52) U.S. Cl. ............................... 123/184.21; 123/184.51
(58) Field of Search .......................... 123/184.21, 184.51, 123/184.54

(56) References Cited

U.S. PATENT DOCUMENTS

| | | | |
|---|---|---|---|
| 4,232,641 | 11/1980 | Curtil | 123/76 |
| 4,356,798 | 11/1982 | Sakaoka et al. | 123/52 MF |
| 4,928,639 | * 5/1990 | Schatz | 123/184.54 |
| 4,986,225 | * 1/1991 | Wu et al. | 123/184.54 |
| 5,009,199 | * 4/1991 | MacFarlane | 123/184.54 |
| 5,660,155 | * 8/1997 | Taue et al. | 123/184.54 |

* cited by examiner

*Primary Examiner*—Willis R. Wolfe
*Assistant Examiner*—Jason A. Benton
(74) *Attorney, Agent, or Firm*—Lyon & Lyon LLP

(57) ABSTRACT

A four stroke combustion engine and method of operation of use and control is disclosed. The engine includes a combustion chamber with an intake manifold coupled to the combustion chamber. A one-way valve is located within the intake manifold. The engine includes an intake valve for modulating the flow of a fuel-air mixture into and out of the combustion chamber. The engine preferably employs a fixed, late closing intake valve. A plenum chamber is located in the intake manifold. The plenum chamber is located downstream of the one-way valve and upstream of the intake valve. During the compression stroke of the engine, a pressurized charge of fuel-air mixture is stored within the manifold and plenum. The amount of the fuel-air mixture stored within the plenum is controlled by adjusting the volume of the plenum, or, alternatively, a plenum valve is used to regulate the amount of fuel-air mixture entering/exiting a fixed volume plenum.

33 Claims, 9 Drawing Sheets

PRESSURE - VOLUME SCHEMATIC
INTAKE PLENUM ENGINE (LIVC)

INTERNAL COMBUSTION ENGINE WITH INTAKE MANIFOLD PLENUM AND METHOD OF USE

BACKGROUND OF THE INVENTION

The field of the invention relates to combustion engines. More specifically the invention relates to internal combustion engines that utilize late-closing intake valves.

Recently, much attention has been give to gasoline engines that operate as atmospheric Miller engines. The atmospheric Miller engine operates without a supercharger and utilizes delayed intake valve closure. The atmospheric Miller engine is of particular interest since the engine has been employed to operate at a higher expansion ratios. The higher expansion ratio, all else being equal, improves the thermal efficiency of the engine, and thus improves the fuel economy of the engine. Another beneficial aspect of the atmospheric Miller engine is that pumping losses generated by the throttle valve are reduced.

It has been discovered, for example, that a 2.6 liter Miller cycle engine equipped with rotary valves to control induced charge has similar fuel consumption characteristics as a conventional 3.0 liter Diesel engine. See Ueda et al., *A Naturally Aspirated Miller Cycle Gasoline Engine—Its Capability of Emission Power and Fuel Economy*, SAE Technical Paper Series, February 1996. This is particularly important since Miller-based engines are potential replacements for Diesel engines. Diesel engines, while generally more fuel efficient than their spark-ignited counterparts, have poor emission qualities. Moreover, recent scientific studies have indicated that the combustion products produced by Diesel engines include potential carcinogens. For these reasons, Miller-type engines have the potential to replace current Diesel engines that are commonly found in buses, trucks, vans, and the like where fuel economy is highly desired. Miller-type engines also have the potential to be used in hybrid automobiles such as those recently prototyped by several automobile manufacturers.

In general, an atmospheric Miller spark-ignition engine that sets the intake valve closing very late in the compression stroke and uses no throttle valve produces a higher efficiency, yet lower specific power output engine as compared to an equivalent standard engine. The overall efficiency increases due to lower pumping losses resulting from the absence of a throttle valve. The improved thermal efficiency results if a larger expansion ratio is used. The lower power output results because the late closure of the intake valve traps only a fraction of the intake mixture at the end of the compression stroke, expelling the balance of the fuel-air mixture back into the intake manifold.

This conventional atmospheric Miller engine design is disadvantageous because the engine is difficult to start. This problem is caused by inadequate vaporization of the fuel-air mixture due to low effective compression heating. In addition, the intake charge density remains essentially the same during the starting and running of the engine due to the absence of the self-regulating effect of the pressure drop across a throttle valve.

More recently, increasing attention has been given to atmospheric Miller engines that employ variable valve timing. Variable valve timing indicates that the closure time of the intake valve is varied and controlled during engine operation. Various mechanisms and methods have been employed to alter the valve timing. These include such things as adjusting the phase of the cam shaft, using rotary valves and employing mechanical linkages and the like to adjust valve timing. Engines using variable valve timing, however, suffer from a number of limitations. One particular problem is that the engine still lacks sufficient compression heating. In addition, variable valve timed Miller engines are quite complex and require a number of components. Not only does this make the engines more difficult to manufacture, this also adds frictional losses to the engine, decreasing engine efficiency. Also, small changes in the timing of the closing (often only 1°–2°) can significantly impact engine performance.

U.S. Pat. No. 4,917,058, issued to Nelson et al., discloses a method and apparatus for reducing pumping losses and improving brake specific fuel consumption for an internal combustion engine. The method employs variable valve timing by using a splittable cam mechanism. The engine does not use a throttle valve. During the compression stroke, the expelled inducted charge is prevented from communicating with the atmosphere by the provision of a check valve. By preventing the expelled fuel air mixture from communicating with the atmosphere, a supercharging effect is produced and fuel is conserved. The Nelson et al. device, however, still utilizes variable valve intake timing as a control mechanism. Thus, a rather complex arrangement is needed to control the engine.

Accordingly, there is a need for an atmospheric Miller engine and method of control that avoids the complexities and difficulties inherent in variable valve timed engines. A practical atmospheric Miller engine should allow the expansion and compression ratios to be sent independently and allow simple control of the combustion charge density over a wide operating range without obstructing the intake pathway. In addition, the engine would produce reasonably high specific output and not require the mechanical or manufacturing complexities of variable valve timed Miller engines.

SUMMARY OF THE INVENTION

In a first aspect of the invention, an engine is disclosed that includes a combustion chamber and an intake manifold coupled to the combustion chamber. A one-way valve is located in the intake manifold. An intake valve is provided for modulating the flow of a fuel-air mixture into and out of the combustion chamber. The intake manifold includes a plenum chamber located downstream of the one-way valve and upstream of the intake valve.

In a second aspect of the invention, a spark-ignition engine is disclosed that includes a plurality of combustion chambers. An intake manifold is coupled to the plurality of combustion chambers via intake manifold branches in the intake manifold. A one-way valve is positioned in each of the plurality of intake manifold branches. The engine further includes a plurality of intake valves for modulating the flow of a fuel-air mixture into and out of the combustion chambers, each combustion chamber having at least one intake valve. A plurality of plenum chambers are connected to the intake manifold branches, wherein each plenum chamber is positioned downstream of the one-way valve. Each combustion chamber has an associated plenum chamber.

In another separate aspect of the invention, a method of controlling the effective compression ratio of a combustion engine through the use of a plenum is disclosed. The method includes the step of introducing a fuel-air mixture into an intake manifold, the fuel-air mixture passing through a one-way valve into the intake manifold. The fuel-air mixture is then introduced into a combustion chamber during the intake stroke. The fuel-air mixture is compressed in the combustion chamber such that a portion of the fuel-air mixture exits the combustion chamber and enters the intake manifold and plenum during the compression stroke. The volume of the plenum is adjusted to alter the effective compression ration of the engine.

In yet another aspect of the invention a method of controlling the effective compression ratio of a combustion engine is disclosed wherein the method includes the step of controlling the amount of a fuel-air mixture entering a plenum located in the intake manifold.

In still another aspect of the invention, a method of controlling the power output of a four-stroke combustion engine is disclosed. The method employs a plenum located in the intake manifold. The method includes the steps of introducing a fuel-air mixture into a combustion chamber, the fuel air mixture passing through a one-way valve in the intake manifold prior to entering the combustion chamber via an intake valve. A pressurized charge of the fuel-air mixture is then stored within the manifold and plenum, the pressurized charge of fuel-air mixture exiting the combusting chamber and entering the plenum during the compression stroke of the engine. The pressurized charge of fuel-air mixture is then reintroduced into the combustion chamber on a next intake stroke. The power output is controlled by controlling the amount of pressurized fuel-air mixture stored within the plenum for each compression stroke.

In still another aspect of the invention, a method of operating a combustion engine is disclosed. The method includes the steps of opening an intake valve for the intake stroke of the engine. A fuel-air mixture is then introduced into the combustion chamber. The fuel-air mixture is then compressed during the compression stroke, wherein at least a portion of the fuel-air mixture exits the combustion chamber and enters the manifold and plenum through an open intake valve. The intake valve is then closed during or at the end of the compression stroke, wherein when the intake valve closes, a pressurized fuel-air mixture is stored within the manifold and plenum, and the fuel-air mixture is contained therein by a one-way valve and the closed intake valve.

The fuel-air mixture is then combusted during a combustion stroke. The combusted fuel-air mixture is then exhausted from the combustion chamber through an exhaust valve during an exhaust stroke. The intake valve is then opened for the next intake stroke. A fuel-air mixture containing the pressurized fuel-air mixture stored in the plenum and manifold is then introduced into the combustion chamber.

DETAILED DESCRIPTION OF THE PREFERRED EMBODIMENTS

Figure 1:
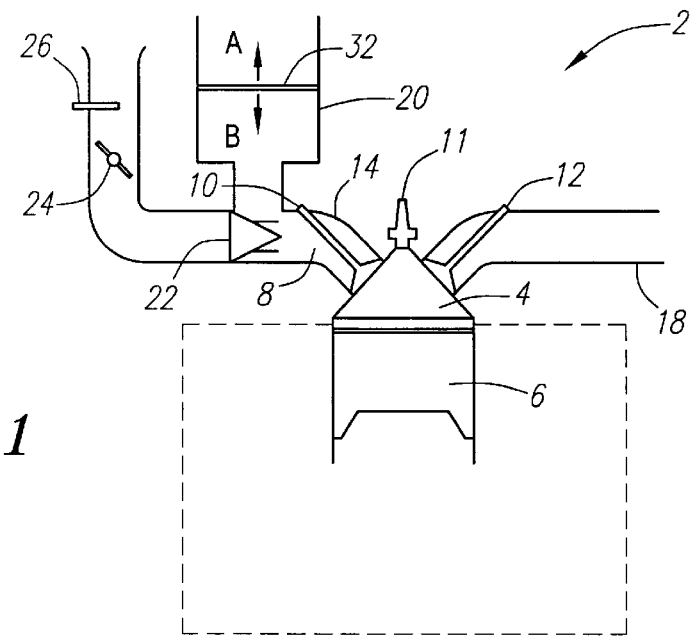
FIG. 1 is a schematic illustration of one possible engine configuration employing a variable volume plenum.
Figure 2:
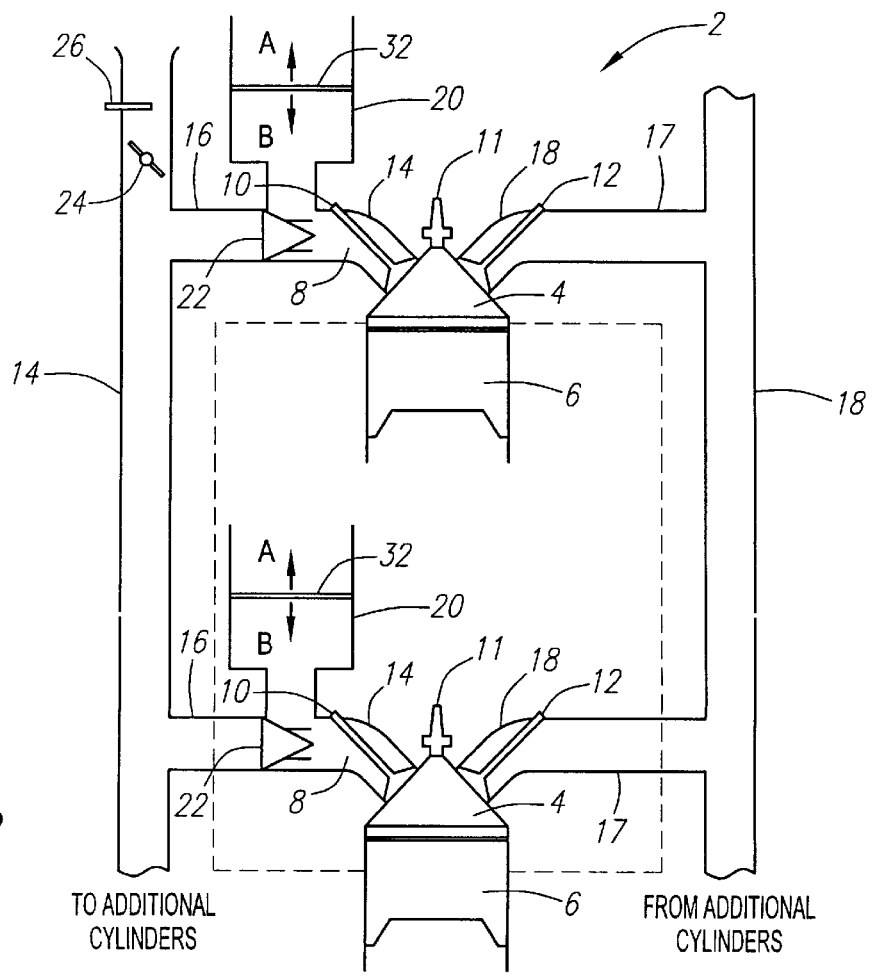
FIG. 2 is a schematic illustration of an engine according to the invention that has multiple intake branches in the intake manifold.

Referring now to the Figures, a description of the device and method will now be described. FIG. 1 schematically illustrates a modified atmospheric Miller engine generally designated as engine 2 according to the present invention. The engine 2 preferably includes one or more combustion chambers 4, i.e., as shown in FIG. 2. Each combustion chamber 4 contains a piston 6 therein. Preferably, the engine 2 is a four-stroke OTTO engine that includes an intake stroke, a compression stroke, a power stroke, and an exhaust stroke.

Each cylinder or combustion chamber 4 includes at least one intake valve 10 and at least one exhaust valve 12. Each cylinder or combustion chamber 4 also includes a means of ignition such as a spark plug 11. An intake manifold 14 connects to the combustion chamber 4 and provides a passageway for the fuel-air mixture 8 to pass into and out of the combustion chamber 4. Preferably, when the engine 2 contains multiple combustion chambers 4, for example, as shown in FIG. 2, the intake manifold 14 has a number of intake branches 16 wherein each intake branch 16 connects to a corresponding combustion chamber 4. It should be understood that the entire intake manifold 14 includes a portion or segment that is common to each combustion chamber 4 as well as each intake branch. 16 of the intake manifold 14. During operation of the engine 2, a charged fuel-air mixture 8 is stored in only a portion of the entire intake manifold 14.

An exhaust manifold 18 preferably connects to the combustion chamber 4 and acts as a passageway for combustion gases to pass through. The exhaust manifold 18 may include exhaust branches 17. The intake valve 10 and exhaust valve 12 are opened and closed, in a typical manner, through a lobed camshaft (not shown).

The engine 2 is operated as a modified atmospheric Miller-type engine 2 wherein the intake valve 10 closes at a later time than conventional non-Miller-type engines. More specifically, the intake valve 10 closes at some point after the piston 6 runs through bottom dead center (compression) during the compression stroke and at or before top dead center (power). Preferably, the intake valve 10 closes at a fixed time during operation of the engine 2. However, it should be appreciated that the time at which the intake valve 10 closes may be varied as it is in current variable valve timed engines. Accordingly, both fixed and variable timed engines 2 are within the scope of this invention.

Located upstream of the intake valve 10 in the intake manifold 14 is located a plenum 20 (also called a plenum chamber 20). The plenum 20 comprises a chamber or volume that is separate and apart from the intake manifold 14. Preferably, when the engine 2 includes multiple combustion chambers 4, as shown in FIG. 2, each combustion chamber 4 has an associated plenum 20. Preferably, each plenum 20 is located in a corresponding intake branch 16.

Located upstream of the plenum 20 and intake valve 10 is a one-way valve 22. Preferably, the one-way valve 22 is a reed valve. Referring to FIG. 2, when multiple combustion chambers 4 are used in the engine 2, it is preferable that each intake branch 16 contain a one-way valve 22. The one-way valve 22 permits the fuel-air mixture 8 to pass into the intake manifold 14 but does not permit the fuel-air mixture to pass from the intake manifold 14 to the atmosphere.

In one aspect of the invention, a throttle valve is located upstream of the one-way valve 22. In this aspect of the invention, the throttle valve 24 is used primarily when starting the engine 2 when engine speed is low or when the engine 2 is idling. In this regard, pumping losses are minimized to a certain extent because the throttle effect is only present in a relatively narrow operating range. The throttle valve 24 can also act as a fail safe device if the plenum control system should falter or fail. It should be noted, however, that the throttle valve 24 is optional and, in one preferred embodiment of the invention, the throttle valve 24 is eliminated altogether.

As seen in FIGS. 1 through 6, a fuel-air induction device 26 is also located upstream of the throttle valve 24 in the intake manifold 14. The fuel-air induction device 26 can be a carburetor, fuel-injector, or other similar type of fuel induction device. The fuel-air induction device 26 may also be located in the intake manifold 14, just upstream of the intake branch and downstream of the throttle valve 24, or alternatively, the fuel-air induction device 26 may be located in the intake manifold 14, either upstream or downstream of the one-way valve 22.

Figure 3:
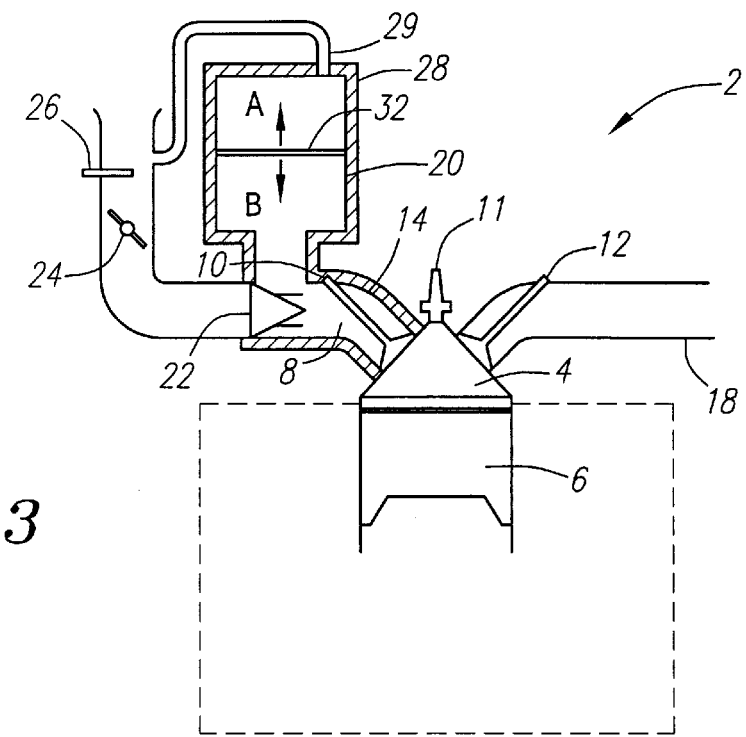
FIG. 3 illustrates the plenum and intake manifold surrounded with insulation to retain the heat of compression.

FIG. 3 illustrates one aspect of the invention, wherein the plenum 20 is surrounded by an insulation material 28. The insulation material 28 may also surround a portion of the intake manifold 14 including the intake branches 16. The insulation material 28 retains the heat of compression within the plenum 20 and/or intake manifold 14 created during the compression stroke. In this aspect of the invention, the plenum 20 includes a vent 29. The insulation material 28 aids in increasing the fuel economy of the engine 2.

Figure 4:
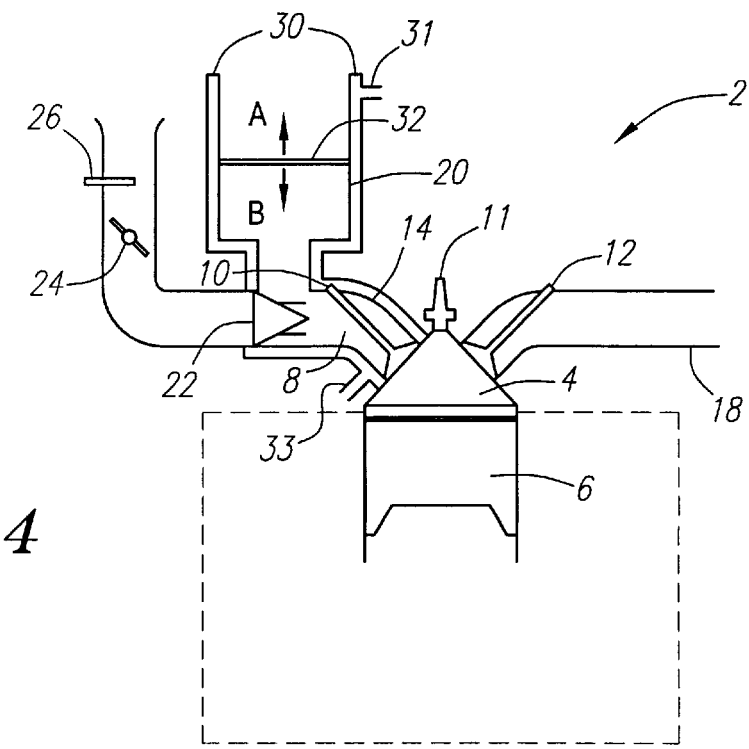
FIG. 4 illustrates the plenum and intake manifold surrounded by a cooling device to extract the heat of compression.

In another aspect of the invention shown in FIG. 4, the plenum 20 is surrounded by a cooling device 30. The cooling device 30 may also surround and extract heat from a portion of the intake manifold 14 including intake branches 16. The cooling device 30 extracts the heat of compression within the plenum 20 and/or intake manifold 14. The cooling device 30 preferably utilizes a cooling fluid such as a gas or liquid that travels through the cooling device 30. Preferably, the cooling device fluid enters at cooling fluid entrance 31 and exits via cooling fluid exit 33. Of course, the orientation of the entrance 31 and exit 33 can be reversed. The cooling device 30 aids in increasing the power output of the engine 2.

With reference now to FIGS. 1 through 4, a description of the plenum 20 of one embodiment of the invention will now be given. FIG. 1 illustrates a plenum 20 having a variable volume. The volume of the plenum 20 is adjusted through a plenum piston 32. When plenum piston 32 moves upward, as shown by the arrow A, the volume of the plenum 20 available for the fuel-air mixture 8 increases. Conversely, when the plenum piston 32 moves downward, as shown by arrow B, the volume of the plenum 20 available for the fuel air mixture 8 decreases. Consequently, by moving the plenum piston 32 within the plenum 20, the total volume of a portion of the intake manifold 14 (from the one-way valve 22 to the intake valve 10) and plenum 20 can be varied. By altering this total volume, the compression ratio as well as the charge density can be varied during engine 2 operation. When fixed valve timing is employed, this is done without the use of any complicated variable valve timing mechanism.

Figure 13:
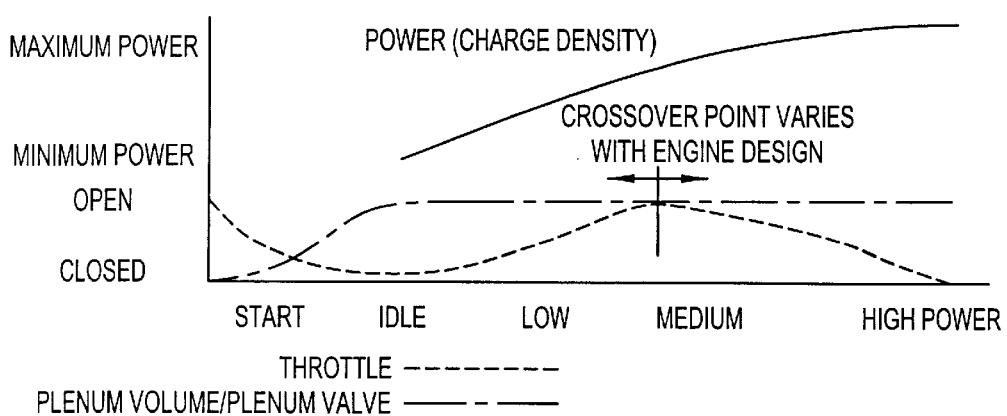
FIG. 13 illustrates the power output of the engine according to the invention over a range of operating conditions.
Figure 13:
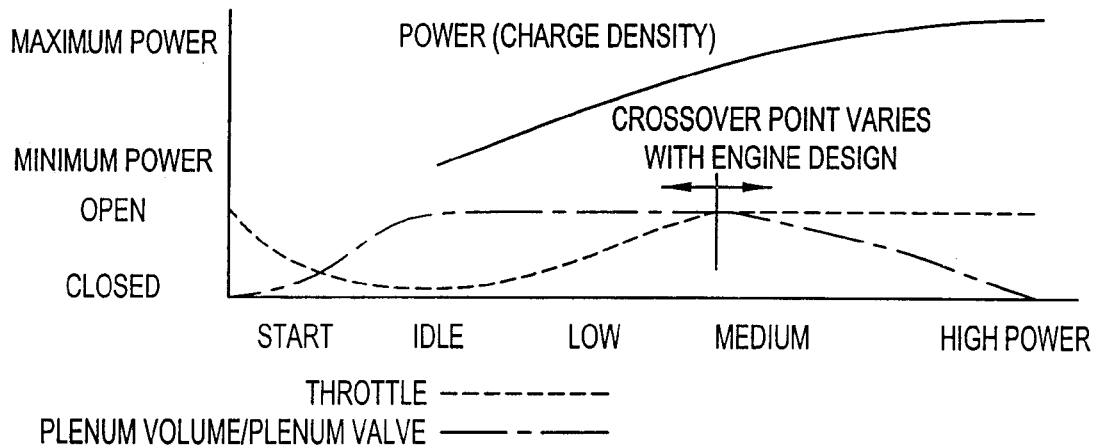
Figure 13:
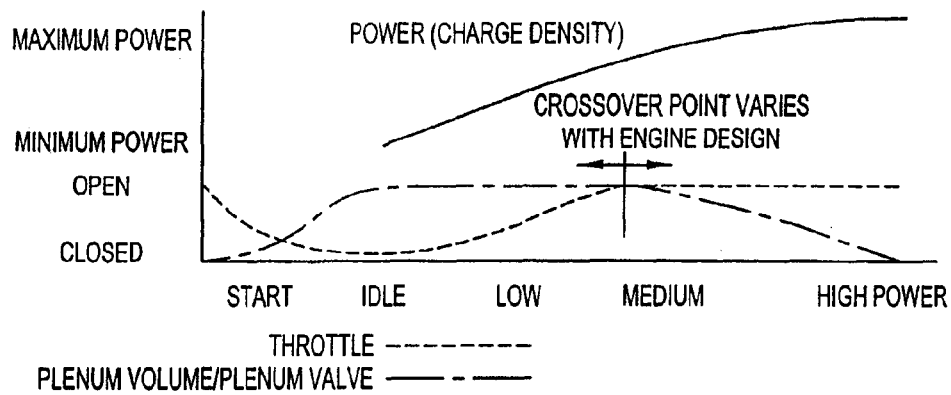

As seen in FIG. 2, preferably, each cylinder or combustion chamber 4 has an associated plenum 20. In addition, the volume of the plenum 20 is varied dynamically over a wide range of engine 2 operating conditions, for example, as shown in FIG. 13. In this regard, the engine 2 can be optimized for a particular compression ratio or charge density for any given load or fuel.

Figure 5:
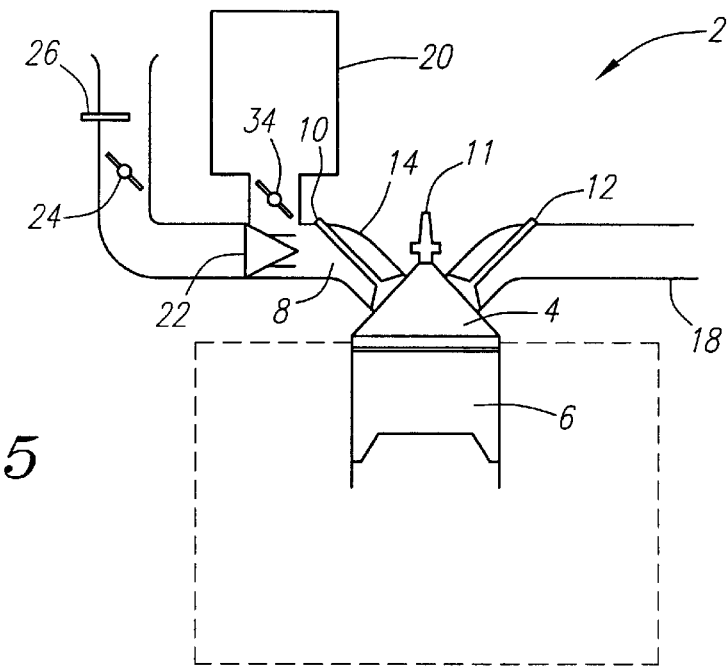
FIG. 5 is a schematic illustration of another possible engine configuration that employs a fixed volume plenum with a plenum valve.

An alternative embodiment of the invention is shown in FIG. 5. Instead of using a plenum 20 containing a plenum piston 32, this embodiment employs a plenum valve 34 that regulates the flow of the fuel-air mixture 8 into and out of the plenum 20. In this embodiment, the compression ratio and the intake charge density are regulated dynamically by restricting flow into and out of the plenum 20 via the plenum valve 34.

Figure 6:
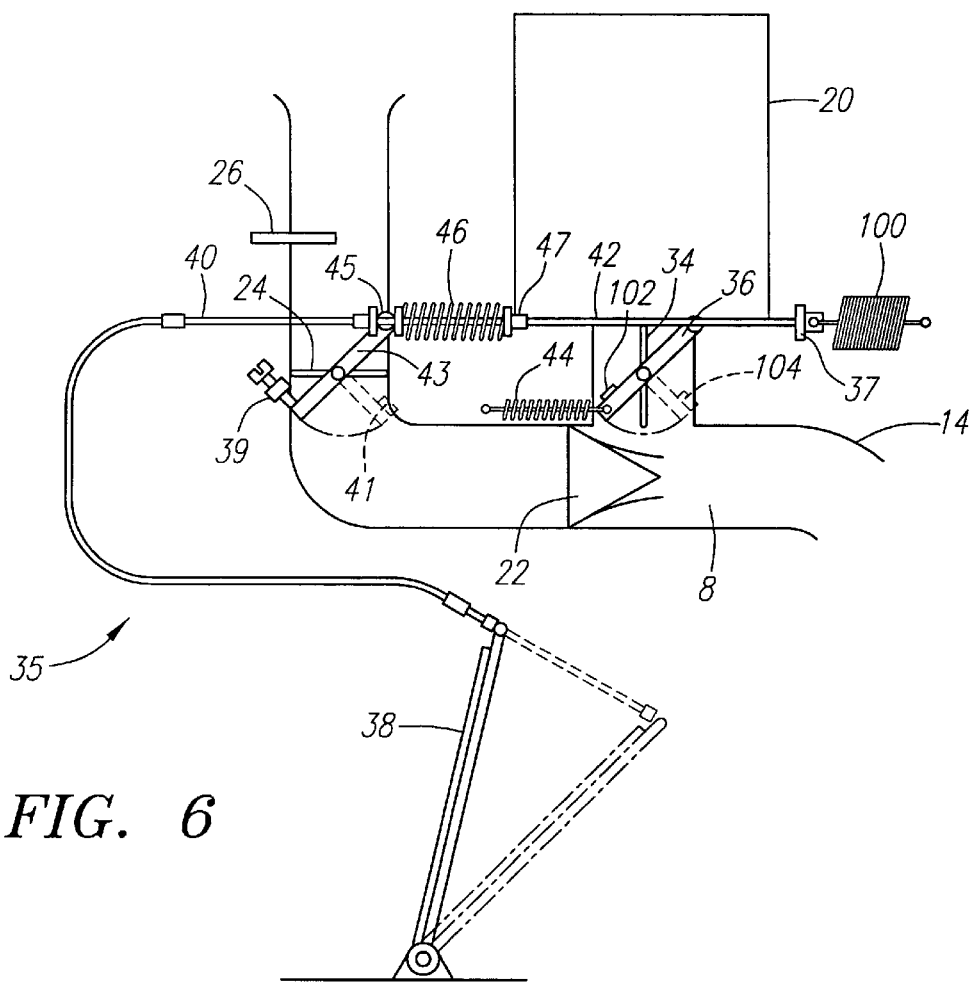
FIG. 6 illustrates a mechanical linkage mechanism for controlling one or more plenum valves.

The plenum valve 34 is preferably actuated via a mechanical linkage to increase/decrease flow therethrough. When an optional throttle valve 24 is present, the throttle valve 24 and plenum valve 34 are advantageously connected via a mechanical linkage, for example, as shown in FIG. 6 to operate in tandem. As with the variable volume plenum 20 embodiment, the engine 2 can be optimized for a particular compression ratio or charge density for any given load.

The quantity of the fuel-air mixture 8 delivered to the plenum 20 can thus be altered by moving the plenum piston 32, in one embodiment, or alternatively, through adjustment of a plenum valve 34 in another separate embodiment.

With reference to FIG. 6, a description of a preferred mechanical linkage mechanism 35 for controlling the plenum valve 34 will now be described. In this aspect, the plenum valve 34 is controlled via a mechanical linkage 36. The accelerator 38 is connected to an acceleration cable 40 or the like which translates in response to movement in the accelerator 38. A separate plenum valve linkage segment 42 is connected to the accelerator cable 40 to open and close the plenum valve 34 via mechanical linkage 36 in response to movement in the accelerator cable 40. A throttle linkage segment 43 also connects to the accelerator cable 40 to an optional throttle valve 24 to simultaneously control the throttle valve 24.

Preferably, the throttle valve 24 includes an adjustable idle stop 39 and an open stop 41. A spring support 45 is connected to an end of the accelerator cable 40 and attaches to one end of an overrun spring 46. The other end of the overrun spring 46 is biased against a second spring support 47 connected to the plenum valve linkage segment 42. Of course, the throttle linkage segment 43 and overrun spring 46 are not required if no throttle valve 24 is used.

A return spring 44 is connected to the mechanical linkage 36 to return the plenum valve 34 to its resting position when the accelerator 38 is not depressed. The end of the throttle position overrun spring 46 not connected to the mechanical linkage 36 is affixed to a fixed structure (not shown). Finally, a connector piece 37 connects the plenum valve linkage segment 42 to a main return spring 100. The main return spring 100 is affixed to a fixed structure as well (not shown). Preferably, the plenum mechanical linkage 36 includes an open stop 102 and a closed stop 104. The stops 102,104 limit the motion of the plenum mechanical linkage 36 within its normal operational range. This method of control is preferred for the plenum valve 34 embodiment given its simplicity. This control method does not require sensors, actuators, or an engine control computer. This method is preferred in applications that would not otherwise support the use of a computer-based control system.

The linkage mechanism 35 is shown in FIG. 6 as controlling one plenum valve 34. However, the linkage mechanism 35 can control multiple plenum valves 34 via plenum multiple mechanical linkages 36.

Figure 7A:
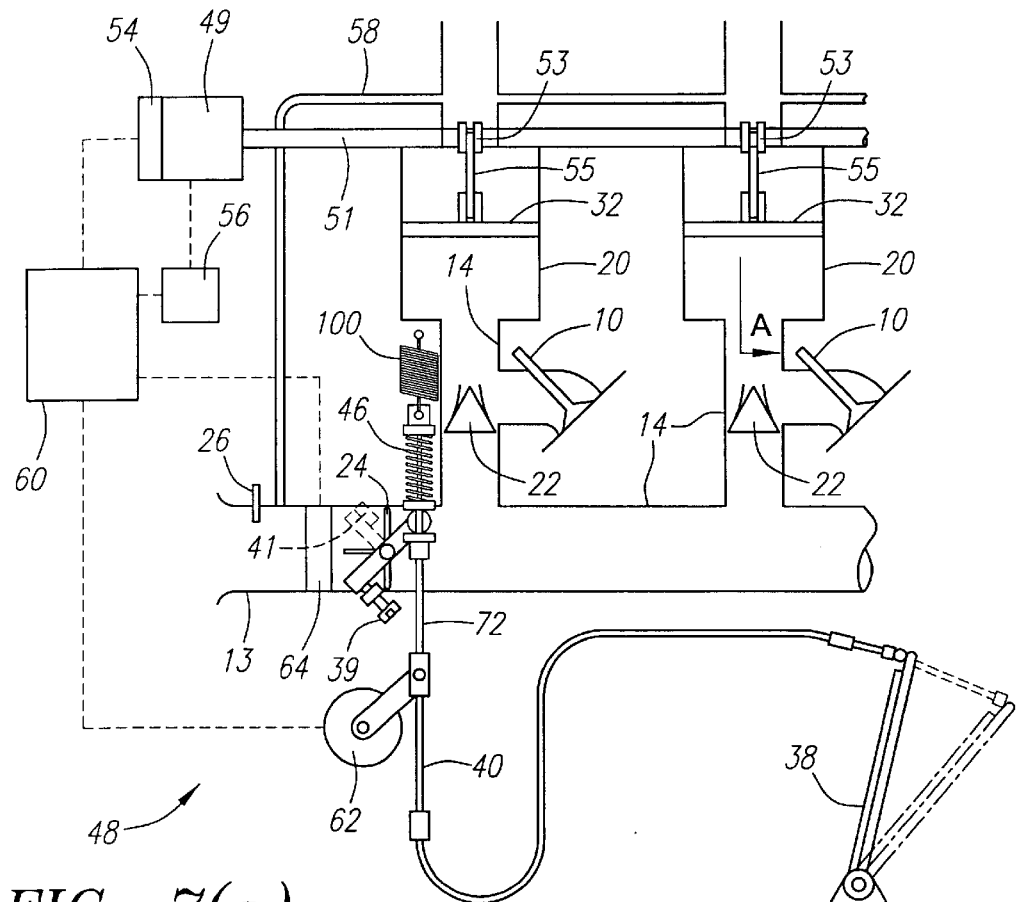
FIG. 7(a) illustrates an electrical plenum control mechanism for controlling the plenum piston.
Figure 7B:
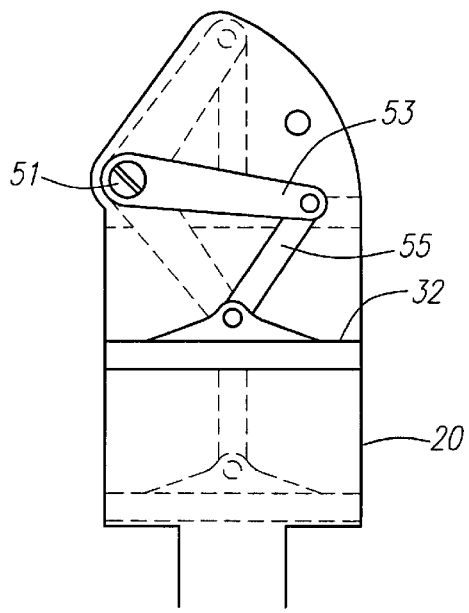
FIG. 7(b) is taken along the line A—A of FIG. 7(a) and illustrates the plenum, plenum piston, the plenum control link, plenum control arm, and plenum control shaft.

FIGS. 7(*a*) and 7(*b*) illustrates an electrical plenum control mechanism 48 used when the volume of the plenum 20 is adjusted by a plenum piston 32. As seen in FIGS. 7(*a*) and 7(*b*), the electrical plenum control mechanism 48 includes plenum piston 32 within a plenum 20. A plenum control link 55 is attached to the plenum piston 32 and moves the plenum piston 32 within plenum 20. Plenum control link 55 pivotally connects to a plenum control arm 53. The plenum control arm 53 is mounted on a plenum control shaft 51. The plenum control shaft 51 engages a position encoder 54 that accurately measures the displacement of the plenum control shaft 51 and thus, the plenum piston 32. A plenum control motor 49 rotates the plenum control shaft 51. Preferably, the plenum control motor 49 is a geared electrical motor 49 with an integral position encoder 54. A motor controller 56 is electrically connected to the plenum control motor 49 to operate the plenum control motor 49. The motor controller 56 is also in electrical communication with an engine control computer 60.

A vent 58 connects the control side of the plenum 20 (i.e., the side of the plenum 20 not in communication with the intake manifold 14) to the intake manifold air inlet 13. The engine control computer 60 is provided and preferably receives inputs from a throttle position sensor 62, an air flow sensor 64, and other sensors, such as a pressure sensor and the like, if required. The engine control computer 60 also receives input from the encoder 54 indicating the position of the plenum control shaft 51. Preferably, the engine control computer 60 also receives a signal from the motor controller 56 in a control loop manner. The engine control computer 60, based on the input signals from the position encoder 54 then outputs a signal to the motor controller 56, which in turn controls the plenum control motor 49 to alter the position of the plenum piston 32.

Still referring to FIG. 7(*a*), the accelerator 38 is connected to an accelerator cable 40 or the like, which, in turn, is linked through a throttle linkage 72 to an optional throttle valve 24 in the intake manifold 14. A throttle position sensor 62 is also connected to the throttle linkage 72 to measure the position of the accelerator 38. This information is reported back to the engine control computer 60. The throttle linkage 72 may include a throttle position overrun spring 46 and throttle return spring 100 as shown in FIG. 7(*a*). As in the previous embodiment, the throttle valve 24 may or may not be present.

Figure 8A:
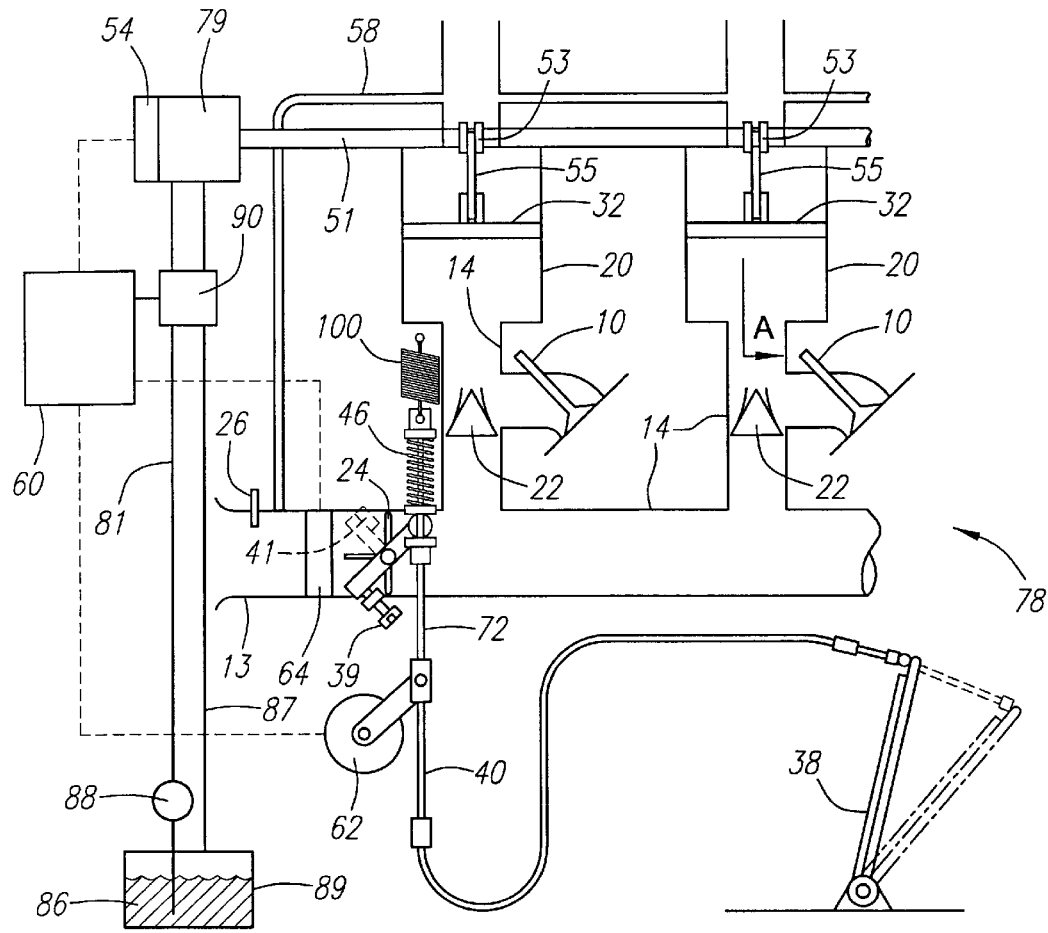
FIG. 8(a) illustrates a hydraulic plenum control mechanism for controlling the plenum piston.
Figure 8B:
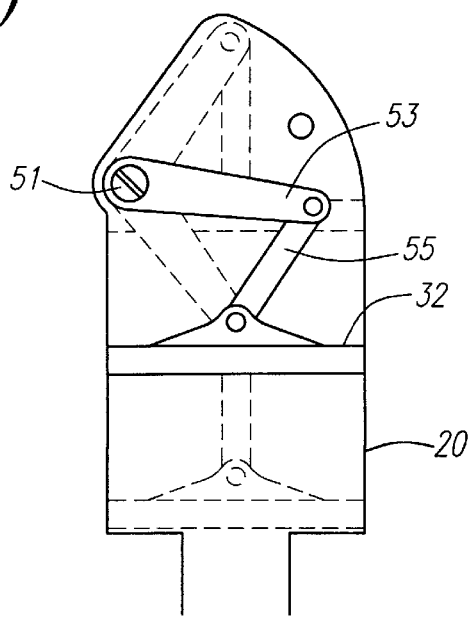
FIG. 8(b) is taken along the line A—A of FIG. 8(a) and illustrates the plenum, plenum piston, the plenum control link, plenum control arm, and plenum control shaft.

Referring now to FIG. 8(*a*) and 8(*b*), a hydraulic plenum control mechanism 78 is disclosed. A plenum piston 32 is located within the plenum 20 and is connected to a plenum control link 55. The plenum control link 55 is pivotally connected to a plenum control arm 53. The plenum control arm 53 is mounted on a plenum control shaft 51. The plenum control shaft 51 engages a position encoder 54 that accurately indicates the position of the plenum control shaft 51 and thus, the plenum piston 32. The position information of the position encoder 54 is output to the engine control computer 60. The engine control computer 60 communicates with a control valve 90. The control valve 90 modulates the flow of a hydraulic fluid 86 to and from a hydraulic actuator 79.

The hydraulic actuator 79 imparts rotary motion in two opposing directions to plenum control shaft 51 in response to hydraulic fluid 86. The hydraulic fluid 86 is under pressure from a pump 88 which draws hydraulic fluid 86 from a reservoir 89. Hydraulic fluid 86 passes to the control valve 90 and hydraulic actuator 79 via sending line 81. Hydraulic fluid 86 returns to the reservoir 89 via return line 87.

The engine control computer 60 controls the control valve 90 in response to signal inputs received by the engine control computer 60. In addition to the position encoder 54 signal, the engine control computer 60 preferably receives input signals from a throttle position sensor 62, an airflow sensor 64, and other sensors, such as a pressure sensor and the like, if required. In this regard, this remaining portion of the hydraulic plenum control mechanism 78 is similar to the electrical plenum control mechanism 48 shown in FIG. 7(*a*). For example, an accelerator 38 connects to a throttle linkage 72 via accelerator cable 40 or the like. The throttle linkage 72 is linked to an optional throttle valve 24 in the intake manifold 14. In addition, the throttle valve linkage 72 connects to the throttle position sensor 62.

Figure 9:
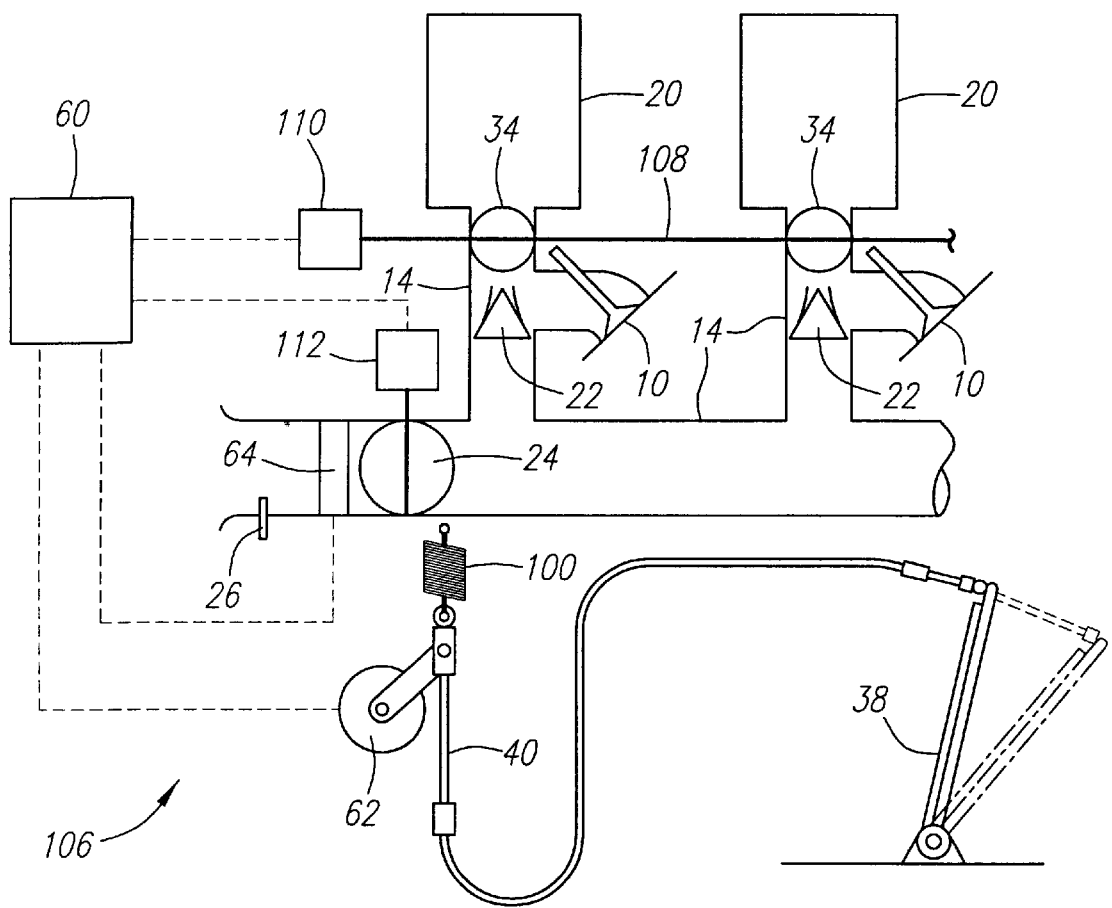
FIG. 9 illustrates an electronic plenum control mechanism for controlling the plenum valve.

Referring now to FIG. 9, an electronic plenum control mechanism 106 is disclosed. A plenum control valve 34 is located between each branch 16 of the intake manifold 14 and each associated plenum 20. Each plenum valve 34 is connected to a plenum valve control shaft 108 such that all of the attached plenum control valves 34 operate in unison. The plenum control shaft 108 is connected to a plenum control actuator 110. The plenum control actuator 110 imparts rotary motion, in two opposing directions, to the plenum valve control shaft 108. The plenum valves 34 close and open in response to this rotary movement of the plenum valve control shaft 108. The plenum control actuator 110 comprises a motor aspect and an encoder aspect. The motor aspect provides rotational force to rotate the plenum control shaft 108, while the encoder aspect accurately measures the position of the plenum control shaft 108 and thus, the plenum control valve(s) 34.

The plenum control actuator 110 is connected to the engine control computer 60 for both power and control. A throttle position actuator 112 is provided for controlling a throttle valve 24. Preferably, the throttle position actuator 112 has a motor aspect and an encoder aspect similar to the plenum control actuator 110. The throttle position actuator 112 is also connected to the engine control computer 60. The engine control computer 60 controls the position of the throttle valve 24 via the throttle position actuator 112. Likewise, the engine control computer 60 controls the position of the plenum valve(s) 34 via the plenum control actuator 110.

Preferably, the engine control computer 60 receives signal inputs from a throttle position sensor 62, an airflow sensor 64, and other sensors such as a pressure sensor and the like, if required. The throttle position sensor is connected to a return spring 100 and to the accelerator 38 via an accelerator cable 40 or the like.

A description will now be given of the operation of the engine 2. A fuel-air mixture 8 is delivered to the intake manifold 14 via a fuel-air induction device 26. The fuel-air mixture 8 passes through the one-way valve 22 and into the combustion chamber 4 during the intake stroke. When the piston 6 reaches bottom dead center (compression) and begins the compression stroke, the intake valve 10 remains open. As the piston 6 compresses the fuel-air mixture 8, a portion of the fuel-air mixture 8 exits the combustion chamber 4 and enters the intake manifold 14 via the open intake valve 10. The fuel-air mixture 8 is prevented from exiting the intake manifold 14 by the one-way valve 22.

Some of the fuel-air mixture 8 that exits the combustion chamber 4 enters the plenum 20 in the intake manifold 14. The fuel-air mixture 8 continues to enter the intake manifold 14 and the plenum 20 until the intake valve 10 closes. It should be noted that the fuel-air mixture 8 in the intake manifold 14 and the plenum 20 is heated to a certain extent by compression heating. Moreover, the stored fuel-air mixture 8 is pressurized within the intake manifold 14 and the plenum 20. The pressurized fuel-air mixture 8 reduces the pumping losses in the next intake stroke.

Once the intake valve 10 closes, the piston 6 continues to compress the fuel-air mixture 8 contained within the combustion chamber 4 until ignition. At ignition, the piston 6 enters the power stroke. After the power stroke, the combusted gases are exhausted via exhaust valve 12 to an exhaust manifold 18 during the exhaust stroke.

The engine 2 next enters the intake stroke wherein the intake valve 10 opens to introduce the charged fuel-air mixture 8 stored within the intake manifold 14 and the plenum 20 into the combustion chamber 4. Preferably, in the initial portion of the intake stroke, the fuel-air mixture 8 entering the combustion chamber 4 comes from the stored fuel-air mixture 8 that is stored or charged within the intake manifold 14 and the plenum 20. After a portion of the intake stroke, the one-way valve 22 opens to introduce additional fuel-air mixture 8 to the combustion chamber 4.

The stored portion of the fuel-air mixture 8 within the manifold 14 and the plenum 20 is heated and under pressure from the prior compression stroke. Consequently, during this intake stroke, the engine 2 is operating under reduced pumping losses, as compared to a traditional spark engine, since the piston 6 is not working against the partial vacuum created by the throttle valve 24.

In one aspect of the invention, as shown in FIG. 4, a cooling device 30 may by used to extract a portion of the heat of compression from the fuel-air mixture 8 stored in the intake manifold 14 and plenum 20. In another aspect, as shown in FIG. 3, insulation 28 is provided to contain the heat of compression in the stored fuel-air mixture 8. The insulation 28 and cooling device 30 are optional, however, and not necessary to the operation of the engine 2.

FIGS. 1 through 9 illustrate a separate plenum 20 in the intake manifold 14. An alternative to providing a separate plenum 20 would be to control the volume of a portion of intake manifold 14 between the one-way valve 22 and the intake valve 10 by moving the position of the one-way valve 22 in the intake manifold 14. In this manner, a portion of the manifold 14 acts as the plenum 20. A separate plenum 20, however, is preferred.

Figure 10:
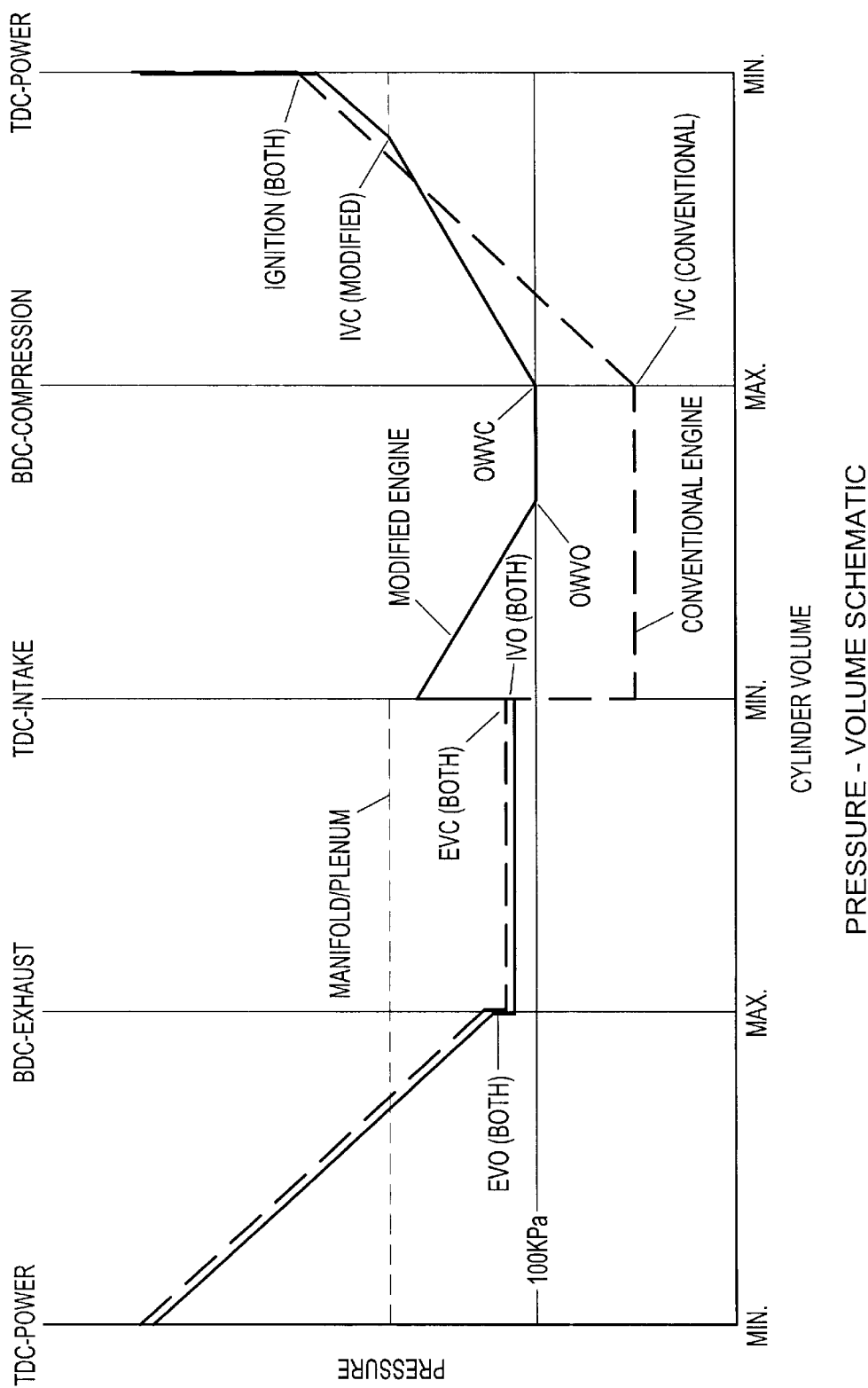
FIG. 10 illustrates a non-folded pressure volume diagram for a conventional engine and an engine according to the invention.

Some of the benefits of the engine 2 can best be seen in the non-folded pressure-volume (P-V) schematic shown in FIG. 10. This graph represents the log of the cylinder pressure on the y-axis and the log of the cylinder volume on the x-axis. A conventional four stroke spark ignition engine is shown by the dashed line and the modified engine 2 is shown in solid. The graphs presume an ideal gas, instantaneous valve operation, and an equivalent compression ratio. In addition, the conventional engine and the modified engine 2 are shown at equal power outputs.

As seen in FIG. 10, the first segment of the P-V diagram illustrates the portion of the power stroke from top dead center (power) to bottom dead center (exhaust). At bottom dead center (exhaust) the exhaust valve 12 opens (EVO). Initially, in both the conventional engine and the modified engine 2, the cylinder pressure are at maximum values. As the power stroke continues, both the conventional engine and the modified engine 2 have identical expansion rates. During the exhaust stroke, the piston 6 proceeds to top dead center (intake), at which time the exhaust valve 12 closes (EVC), and intake valve 10 opens (IVO). It is at this point where the operation of the conventional engine and the modified engine 2 diverge.

The conventional engine is shown working against an intake manifold pressure that is substantially below atmospheric pressure (approximately 100 kpa) until the piston reaches bottom dead center (compression), at which time the intake valve closes. The conventional engine compresses the intake charge to top dead center (power), and the charge is ignited, raising the cylinder pressure to its maximum value.

The modified engine 2, on the other hand, opens in the intake valve 10 to a charged intake manifold 14 and plenum 20. This charging pressure is shown as the dashed horizontal manifold/plenum line in FIG. 10. The slight pressure drop seen at the opening of the intake valve 10 is the result of the expansion of the intake fuel-air mixture 8 from the intake manifold 14 and the plenum 20 into the combustion chamber 4 plus the losses across the intake valve 10. The pressure within the combustion chamber 4 reduces until the one-way valve 22 opens (OWVO). When the one-way valve 22 opens, fuel-air mixture 8 is drawn through the one-way valve 22 with minimal losses until the pressure of the intake manifold 14 reaches atmospheric pressure shortly after bottom dead center (compression), at which point, the one-way valve 22 closes (OWVC).

The modified engine 2 now compresses the intake charge contained in the combustion chamber 4, the intake manifold 14, and the plenum 20 until the intake valve 10 closes (IVC). The intake valve 10 is shown closing at approximately 30° before top dead center (power). It should be appreciated that the invention contemplates the intake valve 10 closing at either a fixed or variable time within the compression stroke. With respect to fixed timing, IVC can occur from about 180° to about 0° before top dead center (power). Preferably, IVC occurs within the range of about 45° to about 25° before top dead center (power). The rate of compression to the closing of the intake valve 10 is reduced as compared to the conventional engine. In addition, the intake manifold 14 and the plenum 20 have been charged to the same pressure as the combustion chamber 4. Compression in the combustion chamber 4 after the closing of the intake valve 10 proceeds until top dead center (power). The charge is ignited and thereby raises the pressure inside the combustion chamber 4.

Figure 11:
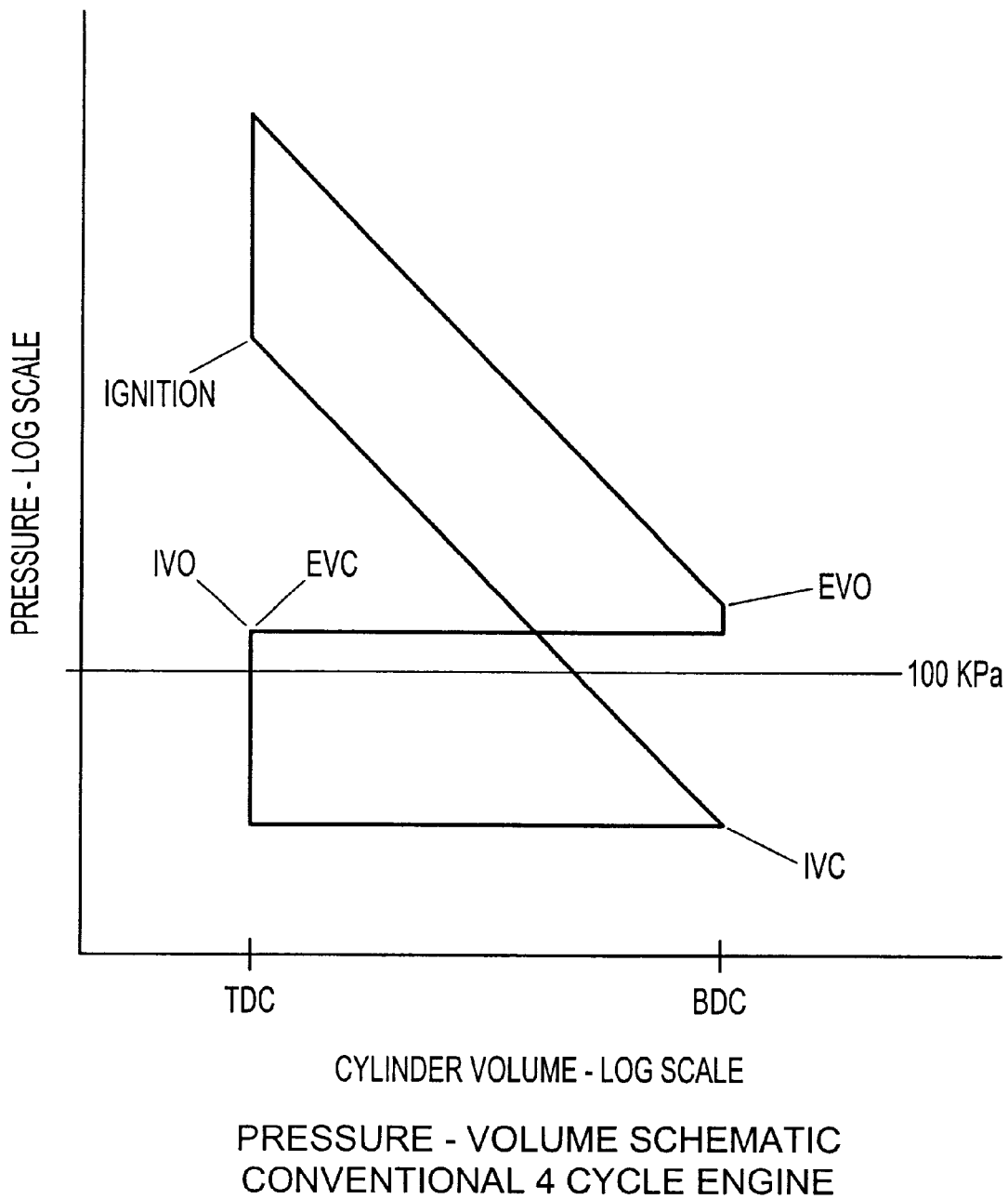
FIG. 11 illustrates a folded pressure volume diagram for the conventional engine.
Figure 12:
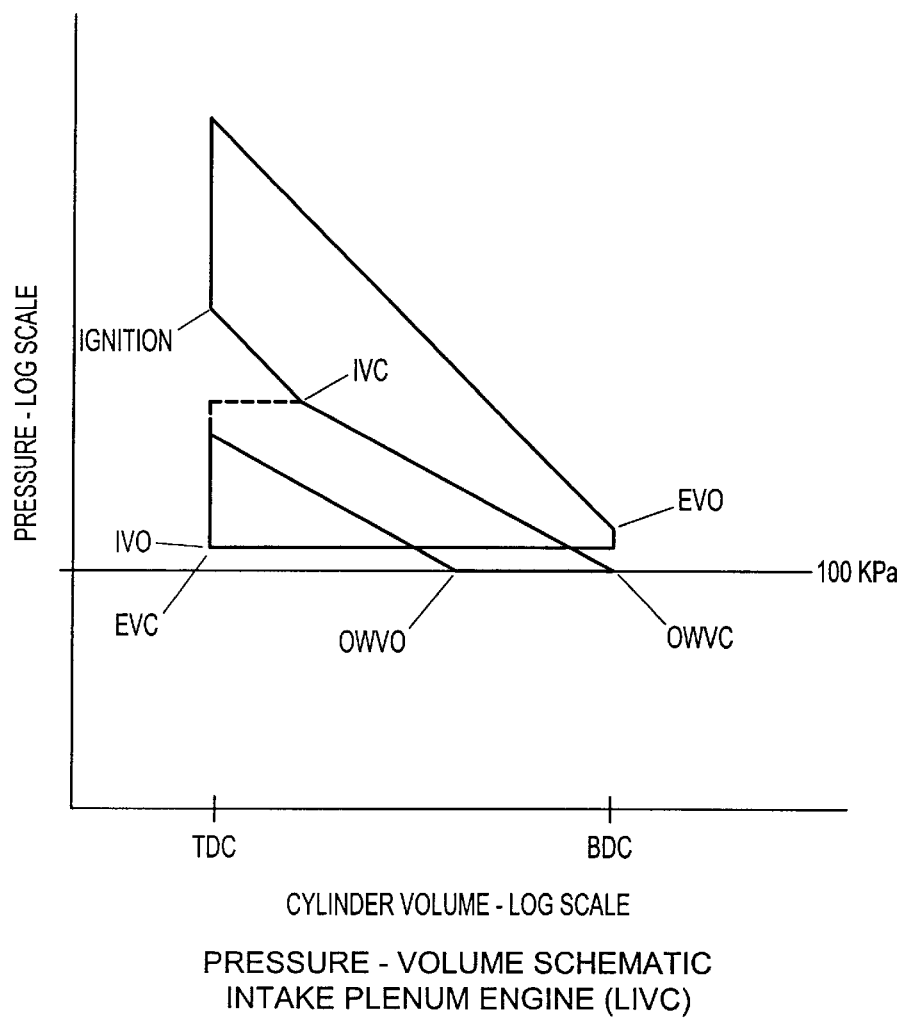
FIG. 12 illustrates a folded pressure volume diagram for an engine according to the invention.

FIGS. 11 and 12 illustrate folded pressure-volume schematic for the conventional engine and the modified engine 2.

The efficiency advantages of the modified engine 2 can be seen from the reduced pumping losses during the intake stroke (top dead center (intake) to bottom dead center (compression)). These gains are offset, to a certain extent, by the reduced power stroke output by the engine 2.

The compression within the combustion chamber 4 occurs in two separate stages. The stages include: (1) compression from bottom dead center (intake) to the time when the intake valve 10 closes (IVC), and (2) compression after the intake valve 10 closes (IVC). The effective or overall compression ratio of the modified engine 2 can be calculated by taking the product of the compression ratio until IVC, and the compression ratio after IVC.

The below-listed formulas define each compression ratio:

$$\text{Compression Ratio to } IVC = \frac{CD \text{ (to } IVC) + CD \text{ (after } IVC) + CCV + \text{intake manifold}(IMV) + \text{plenum }(VPV)}{CD \text{ (after } IVC) + CCV + \text{intake manifold }(IMV) + \text{plenum }(VPV)} \quad (1)$$

$$\text{Compression Ratio after } IVC = \frac{CD \text{ (after } IVC) + CCV}{CCV} \quad (2)$$

The variables are defined as follows: CD is the cylinder displacement; CCV is the combustion chamber volume; IVC is intake valve closure; IMV is the intake manifold volume; and VPV is the volume of the plenum.

For a given fixed cylinder displacement and fixed combustion chamber volume, the modified engine 2 is sensitive to a number of different factors. For example, with respect to the timing of the closing of the intake valve 10 (IVC), the effect of the variable plenum volume (or variable flow plenum when a plenum valve is used) increases as the IVC is set later in the compression stroke, all else being equal. In addition, the total effective compression ratio and the maximum charge density are reduced.

With respect to the volume of the intake manifold 14 located upstream of the intake valve 10 and downstream of the one-way valve 22, all else being equal, as the fixed volume of the intake manifold 14 is increased, the effect of the variable plenum volume (or variable flow plenum when a plenum valve is used) is reduced. In addition, the maximum charge density is reduced.

With respect to the variable plenum volume, an overall compression ratio and power output range can be decided by choosing the IVC set point, the fixed volume of the intake manifold 14, and choosing a variable plenum volume (all else being equal). The upper limit of the compression ratio is fixed by the minimum variable plenum volume, and the lower limit of the compression ratio is fixed by the maximum variable plenum volume.

In light of these aspects of the modified engine 2, the expansion ratio is preferably set for a given cylinder displacement by choosing the appropriate combustion chamber volume, taking into account that the combustion chamber volume at top dead center (power) sets an upper limit on the power output. As the expansion ratio is increased, the corresponding reduction in combustion chamber volume is partially offset by the increased thermal efficiency for a given charge density. For instance, a modified engine 2 having an expansion ratio of 12:1 has a maximum power output of about 70% of that of a conventional engine with a compression ratio and expansion ratio of 8:1.

As stated above, the IVC set-point significantly influences the maximum compression ratio and charge density. Preferably, the IVC set-point is delayed to a late stage in the compression cycle. The IVC set-point may even be delayed such that the intake valve 10 must close to prevent the fuel-air mixture 8 in the intake manifold 14 and plenum 20 from igniting. This extreme delay produces a maximum variable plenum volume effect.

For a given cylinder displacement, combustion chamber volume, and expansion ratio, the intake manifold 14 volume is preferably set to the value that sets the chosen maximum compression ratio/charge density at the minimum variable plenum volume value for the plenum 20. The desired minimum charge density/power output at full throttle is then set to a value determined by the maximum variable plenum volume.

In a modified engine 2, if a throttle valve 24 is needed upstream of the one way valve 22 (for instance, to achieve stable minimum power output levels at idle), thermal efficiency will be maximized when: (1) the expansion ratio is set to the maximum value consistent with the desired power output, (2) the compression ratio is set to a maximum value consistent with the intended fuel octane requirement, and (3) the effective plenum volume is set to the maximum value allowed by mechanical constraints to permit un-throttled operation at minimum power output.

FIG. 13 illustrates the power output of the modified engine 2 over a range of operating conditions. FIG. 13 also shows the status of the throttle valve 24 and plenum valve 32 over the same range of operating conditions.

The modified engine 2 offers a number of advantages over traditional engines and current variable valve timed engines. First, for a given power output, the engine 2 can be operated with a virtually unrestricted flow path in the intake manifold 14, leading to reduced pumping losses, by either varying the volume of the plenum 20 or by restricting the flow into and out of the plenum 20. The modified engine 2 also has reduced compression/octane requirements but no loss in thermal efficiency (mileage). The modified engine 2 can have a thermal efficiency approximately that of a Diesel engine with the octane requirements and emission characteristics of a standard gasoline engine.

The modified engine 2 design offers a major efficiency advantage without an emissions penalty. In addition, the modified engine 2 is not as mechanically complex as some variable valve timed engines. In this regard, the modified engine 2 can be manufactured using conventional parts and methods. The modified engine 2 can be of similar size, weight, and complexity to standard gasoline engines of similar power output, yet offer improved efficiencies of about 10% to about 20% in specific fuel consumption.

While embodiments of the present invention have been shown and described, various modifications may be made without departing from the scope of the present invention. The invention, therefore, should not be limited, except to the following claims, and their equivalents.

What is claimed is:

1. A combustion engine comprising:
    a combustion chamber;
    an intake manifold coupled to the combustion chamber;
    a one-way valve in the intake manifold;
    an intake valve for modulating the flow of a fuel-air mixture into and out of the combustion chamber;
    a fixed volume plenum chamber in the intake manifold, the plenum chamber located downstream of the one-way valve and upstream of the intake valve; and
    a plenum valve for controlling the flow of the fuel-air mixture between the manifold and the plenum.

2. A combustion engine according to claim 1, further comprising a throttle valve located upstream of the one-way valve.

3. A combustion engine according to claim 1, wherein the one-way valve is a reed valve.

4. A combustion engine according to claim 1 further comprising insulation around the plenum for retaining the heat of compression.

5. A combustion engine according to claim 1 further comprising a cooling device around the plenum for extracting the heat of compression.

6. A combustion engine according to claim 1 further including an engine computer controller for controlling the plenum valve during operation of the engine.

7. A combustion engine according to claim 1, wherein the combustion engine has fixed valve timing.

8. A combustion engine according to claim 1, wherein the combustion engine has variable valve timing.

9. A spark-ignition combustion engine comprising:
a plurality of combustion chambers;
an intake manifold coupled to the plurality of combustion chambers via a plurality of intake manifold branches;
a one-way valve positioned in each of the plurality of intake manifold branches;
a plurality of intake valves for modulating flow of a fuel-air mixture into and out of the combustion chambers, each combustion chamber having at least one intake valve;
a plurality of fixed volume plenum chambers connected to each of the intake manifold branches, wherein each plenum chamber is positioned downstream from the one-way valve and wherein each combustion chamber has an associated plenum chamber; and
a plenum valve in each of the plurality of plenum chambers for controlling the flow of the fuel-air mixture between the manifold and each respective plenum chamber.

10. A spark-ignition combustion engine according to claim 9, further comprising at least one throttle valve located upstream of the one-way valves.

11. A spark-ignition combustion engine according to claim 4, wherein the one-way valve are reed valves.

12. A spark-ignition combustion engine according to claim 9 further comprising insulation around at least one of the plenum chambers for retaining the heat of compression.

13. A spark-ignition combustion engine according to claim 9, further comprising a cooling device around at least one of the plenum chambers for extracting the heat of compression.

14. A spark-ignition combustion engine according to claim 9 further including an engine computer controller for controlling the plurality of plenum valves.

15. A combustion engine according to claim 9, wherein the combustion engine has fixed valve timing.

16. A combustion engine according to claim 9, wherein the combustion engine has variable valve timing.

17. A method of controlling the effective compression ratio of a combustion engine through the use of a plenum located in the intake manifold of an engine, the method comprising the steps of:
introducing a fuel-air mixture into an intake manifold, the fuel-air mixture passing through a one-way valve into the intake manifold;
introducing the fuel-air mixture into a combustion chamber via an intake valve during the intake stroke;
compressing the fuel-air mixture in the combustion chamber such that a portion of the fuel-air mixture exits the combustion chamber and enters the intake manifold and plenum during the compression stroke; and
controlling the amount of fuel-air mixture entering the plenum by adjusting a plenum valve located between the plenum and the intake valve.

18. A method of controlling the power output of a four stroke combustion engine by using a plenum located in the intake manifold, the method comprising the steps of:

introducing a fuel-air mixture into a combustion chamber, the fuel air mixture passing through a one-way valve in the intake manifold prior to entering the combustion chamber via an intake valve; and
storing a pressurized charge of the fuel-air mixture within the manifold and plenum, the pressurized charge of fuel-air mixture exiting the combusting chamber and entering the plenum during the compression stroke of the engine;
reintroducing the pressurized charge of fuel-air mixture into the combustion chamber on a next intake stroke; and
controlling the amount of pressurized fuel-air mixture stored within the plenum for each compression stroke by adjustment of a plenum valve located between the plenum and the intake valve.

19. A method of operating a combustion engine by using a plenum located in the intake manifold, the method comprising the steps of:
opening an intake valve for the intake stroke of the engine;
introducing a fuel-air mixture into the combustion chamber;
compressing the fuel-air mixture during the compression stroke, wherein at least a portion of the fuel-air mixture exits the combustion chamber and enters the manifold and plenum through the open intake valve and a plenum valve located between the plenum and the intake valve;
closing the intake valve during or at the end of the compression stroke, wherein when the intake valve closes, a pressurized fuel-air mixture is stored within the manifold and plenum, the fuel-air mixture contained therein by a one-way valve and the closed intake valve;
combusting the fuel-air mixture during a combustion stroke;
exhausting the combusted fuel-air mixture through an exhaust valve during an exhaust stroke;
opening the intake valve for the next intake stroke; and
introducing a fuel-air mixture containing the pressurized fuel-air mixture stored in the plenum and manifold into the combustion chamber.

20. A combustion engine according to claim 1, further comprising a plenum valve control shaft coupled to the plenum valve.

21. A combustion engine according to claim 20, further comprising a plenum control actuator coupled to the plenum control shaft.

22. A combustion engine according to claim 21, wherein the plenum control actuator imparts rotary motion to the plenum valve control shaft to open and close the plenum valve.

23. A combustion engine according to claim 21, wherein the plenum control actuator has a motor aspect and an encoder aspect.

24. A combustion engine according to claim 21, further comprising an engine control computer operatively connected to the plenum control actuator so as to control the position of the plenum valve.

25. A spark-ignition combustion engine according to claim 21, further comprising a plenum valve control shaft coupled to each of the plenum valves.

26. A spark-ignition combustion engine according to claim 25, further comprising a plenum control actuator coupled to the plenum control shaft.

27. A spark-ignition combustion engine according to claim 26, wherein the plenum control actuator imparts rotary motion to the plenum valve control shaft to open and close the plenum valves.

28. A spark-ignition combustion engine according to claim 26, wherein the plenum control actuator has a motor aspect and an encoder aspect.

29. A spark-ignition combustion engine according to claim 26, further comprising an engine control computer operatively connected to the plenum control actuator so as to control the position of the plenum valves.

30. A combustion engine according to claim 1, further comprising a mechanical linkage mechanism coupling the plenum valve with an accelerator.

31. A combustion engine according to claim 30, wherein the mechanical linkage mechanism is further coupled to a throttle valve located upstream of the one-way valve.

32. A spark-ignition combustion engine according to claim 9, further comprising a mechanical linkage mechanism coupling the plenum valves with an accelerator.

33. A spark-ignition combustion engine according to claim 32, wherein the mechanical linkage mechanism is further coupled to a throttle valve located upstream of the one-way valves.

* * * * *

UNITED STATES PATENT AND TRADEMARK OFFICE
CERTIFICATE OF CORRECTION

PATENT NO. : 6,302,076 B1
DATED : October 16, 2001
INVENTOR(S) : Brady

It is certified that error appears in the above-identified patent and that said Letters Patent is hereby corrected as shown below:

<u>Title page</u>,
Items [12] and [76], please change the name of the inventor from "Bredy" to
-- Brady --.

<u>Drawings</u>,
Please substitute FIG. 13, with the attached new FIG. 13.

<u>Column 4</u>,
Line 50, change "branch. 16" to -- branch 16 --.

<u>Column 5</u>,
Line 39, insert -- 16 -- after "branch".

<u>Column 6</u>,
Lines 7 and 8, change "fuel air" to -- fuel-air --.

<u>Column 11</u>,
Line 20, please add the following formula (3):
-- Compression Radio (overall) = (Compression Ratio to IVC) x (Compression Ratio after IVC)     (3) --

<u>Column 12</u>,
Line 10, change "one way" to -- one-way --.
Line 21, change "32" to -- 34 --.

<u>Column 13</u>,
Line 34, change "claim 4" to -- claim 9 --.

UNITED STATES PATENT AND TRADEMARK OFFICE
CERTIFICATE OF CORRECTION

PATENT NO. : 6,302,076 B1
DATED : October 16, 2001
INVENTOR(S) : Brady

It is certified that error appears in the above-identified patent and that said Letters Patent is hereby corrected as shown below:

Column 14,
Line 63, change "claim 21" to -- claim 9 --.

Signed and Sealed this

Ninth Day of July, 2002

Attest:

JAMES E. ROGAN
Attesting Officer    Director of the United States Patent and Trademark Office

UNITED STATES PATENT AND TRADEMARK OFFICE
CERTIFICATE OF CORRECTION

PATENT NO.      : 6,302,076 B1
DATED           : October 16, 2001
INVENTOR(S)     : Brady It is certified that error appears in the above-identified patent and that said Letters Patent is hereby corrected as shown below:

<u>Title page,</u>
Item [12] and [76], please change the name of the inventor from "Bredy" to
-- Brady --.

<u>Drawings,</u>
Please substitute FIG. 13, with the attached new FIG. 13.

<u>Column 4,</u>
Line 50, change "branch. 16" to -- branch 16 --.

<u>Column 5,</u>
Line 39, insert -- 16 -- after "branch".

<u>Column 6,</u>
Lines 7 and 8, change "fuel air" to -- fuel-air --.

<u>Column 11,</u>
Line 20, please add the following formula (3):
-- Compression Ratio (overall) = (Compression Ratio to IVC) x (Compression Ratio after IVC)        (3) --

<u>Column 12,</u>
Line 10, change "one way" to -- one-way --.
Line 21, change "32" to -- 34 --.

<u>Column 13,</u>
Line 34, change "claim 4" to -- claim 9 --.

UNITED STATES PATENT AND TRADEMARK OFFICE
CERTIFICATE OF CORRECTION

PATENT NO.    : 6,302,076 B1
DATED         : October 16, 2001
INVENTOR(S)   : Brady It is certified that error appears in the above-identified patent and that said Letters Patent is hereby corrected as shown below:

Column 14,
Line 63, change "claim 21" to -- claim 9 --.

This certificate supersedes Certificate of Correction July 9, 2002.

Signed and Sealed this

Twenty-ninth Day of April, 2003

JAMES E. ROGAN
*Director of the United States Patent and Trademark Office*